United States Patent [19]

Pascual et al.

[11] Patent Number: 5,710,504

[45] Date of Patent: Jan. 20, 1998

[54] SWITCHED CAPACITOR SYSTEM FOR AUTOMATIC BATTERY EQUALIZATION

[75] Inventors: Cesar Pascual; Philip T. Krein, both of Champaign, Ill.

[73] Assignee: The Board of Trustees of the University of Illinois, Urbana, Ill.

[21] Appl. No.: 650,490

[22] Filed: May 20, 1996

[51] Int. Cl.$^6$ .............. H02J 7/00; H01M 10/44; H01M 10/46

[52] U.S. Cl. .................. 320/6; 320/17; 320/15

[58] Field of Search .................. 320/6, 8, 17, 15, 320/14, 21, 19, 1, 56, 50

[56] References Cited

U.S. PATENT DOCUMENTS

| | | | |
|---|---|---|---|
| 4,079,303 | 3/1978 | Cox | 320/17 |
| 4,479,083 | 10/1984 | Sullivan | 320/6 |
| 4,502,000 | 2/1985 | Mashikan | 320/6 |
| 4,502,001 | 2/1985 | Galloway | 320/6 |
| 4,949,028 | 8/1990 | Brune | 320/6 |
| 4,967,136 | 10/1990 | Nofzinger | 320/6 |
| 5,003,244 | 3/1991 | Davis, Jr. | 320/17 |
| 5,479,083 | 12/1995 | Brainard | 320/2 |
| 5,528,122 | 6/1996 | Sullivan et al. | 320/6 |

*Primary Examiner*—Peter S. Wong
*Assistant Examiner*—K. Shin
*Attorney, Agent, or Firm*—Dressler, Rockey, Milnamow & Katz, Ltd.

[57] ABSTRACT

A switched capacitor system for automatic battery equalization can be used with series coupled batteries as well as primary and backup batteries which are alternately couplable to a load. The system includes a plurality of capacitors and a plurality of switching elements. Each of the capacitors is switched back and forth between a predetermined pair of batteries for the purpose of transferring charge therebetween and equalizing the output voltages of each of the batteries in the pair. The capacitors and switching elements can be configured in a modular fashion. Multiple modules can be used, for example, in combination with multiple batteries which are series coupled to one another. The system could be used in electric vehicles and in battery back-up systems of all types.

38 Claims, 15 Drawing Sheets

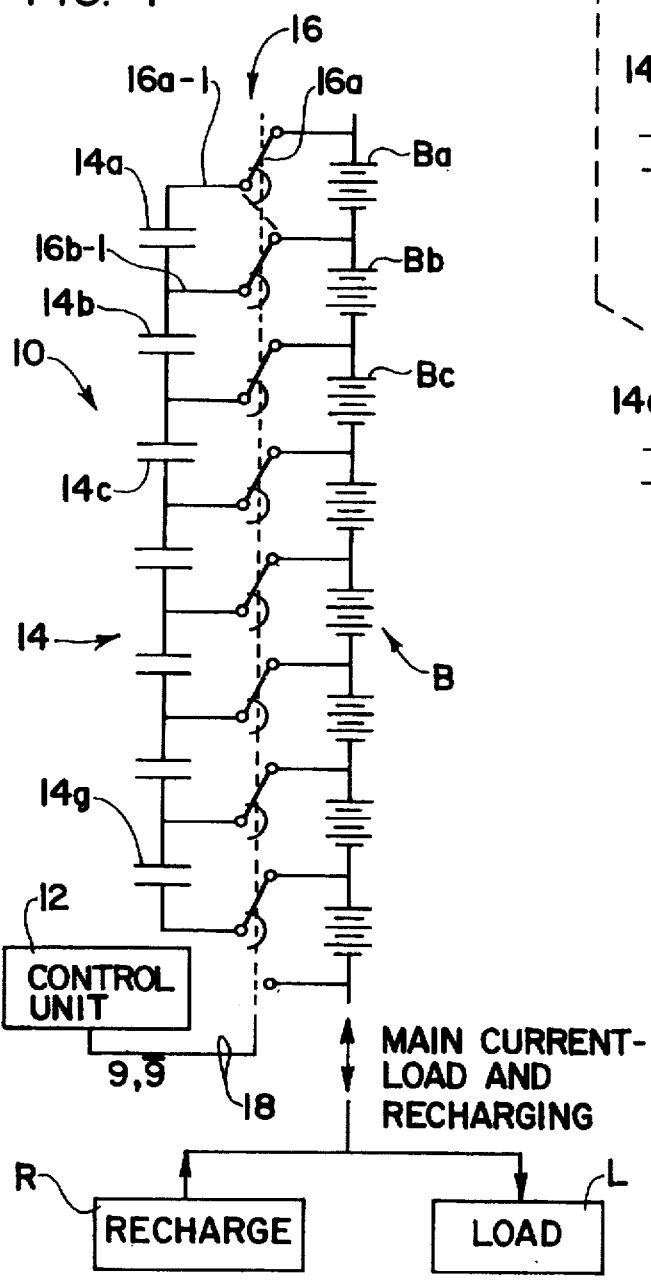
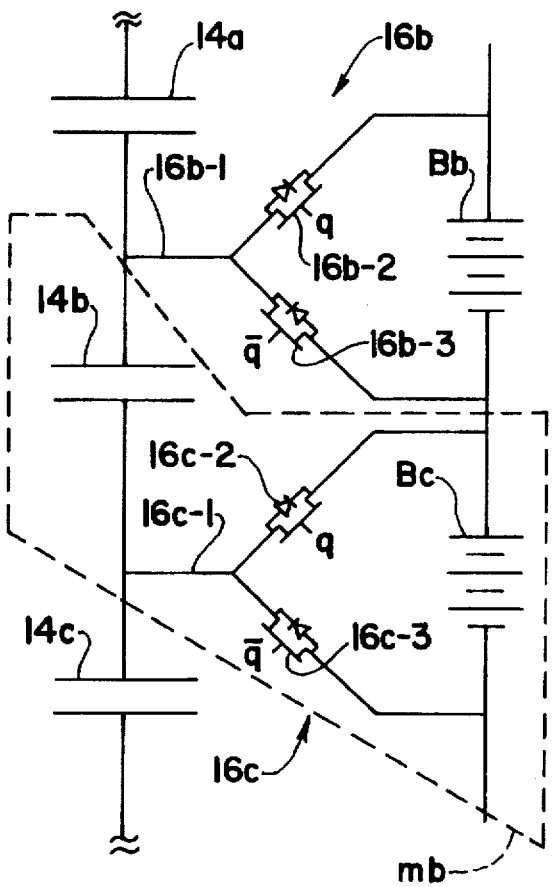
FIG. 1
FIG. 2

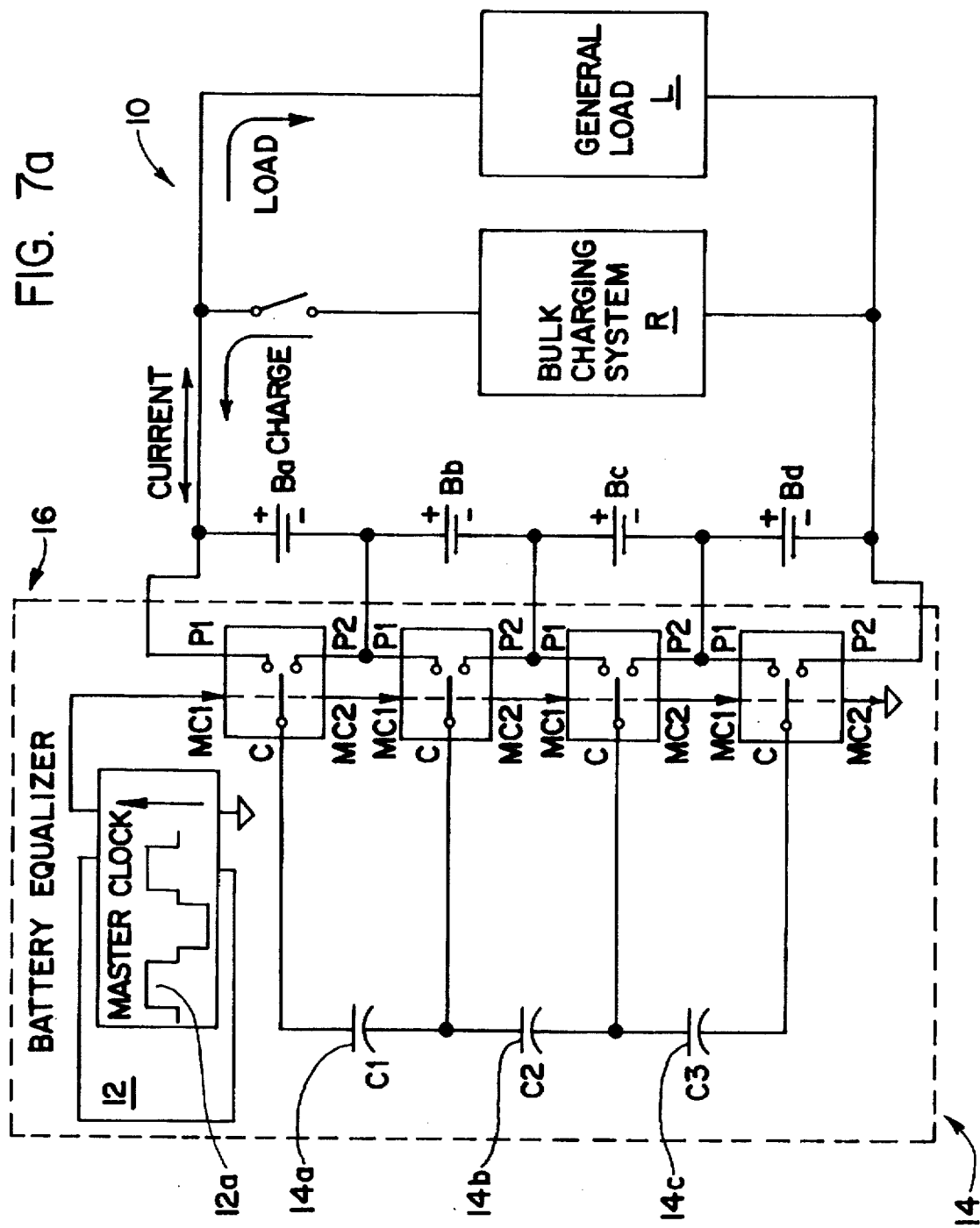

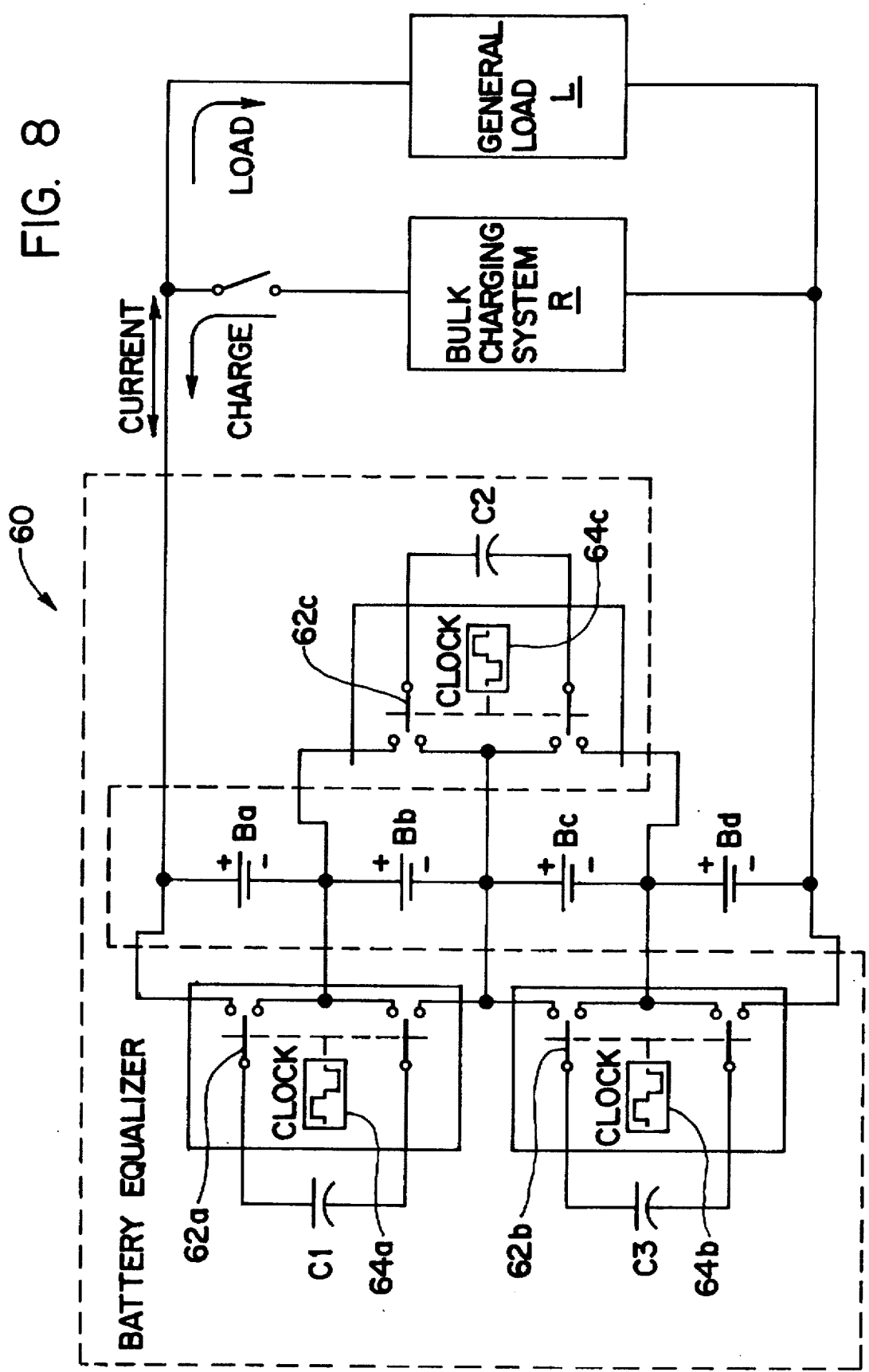

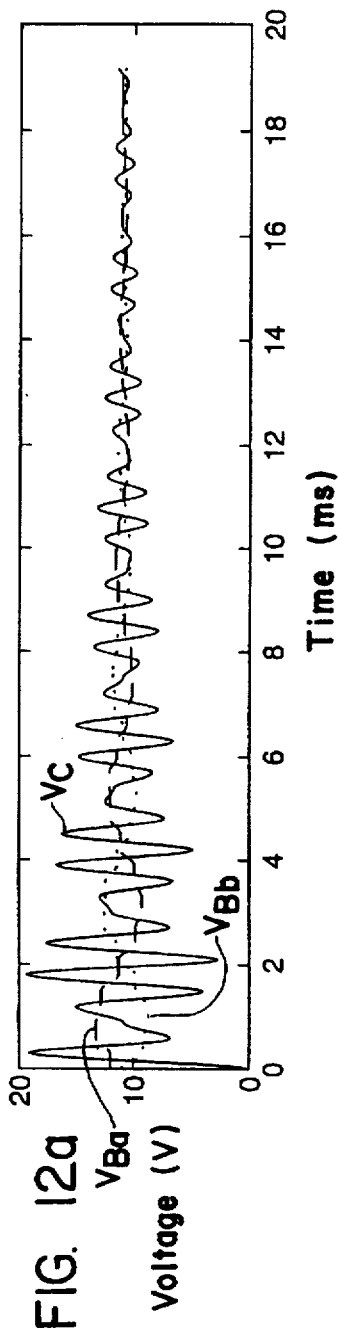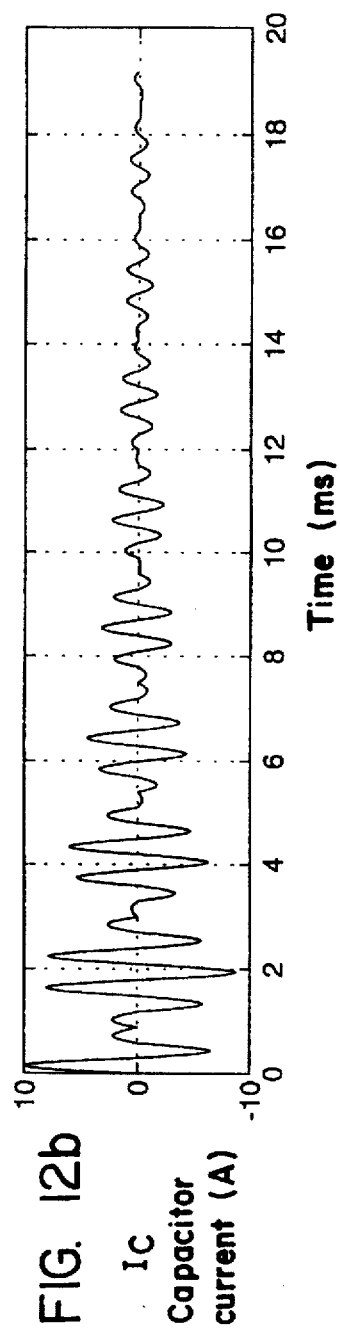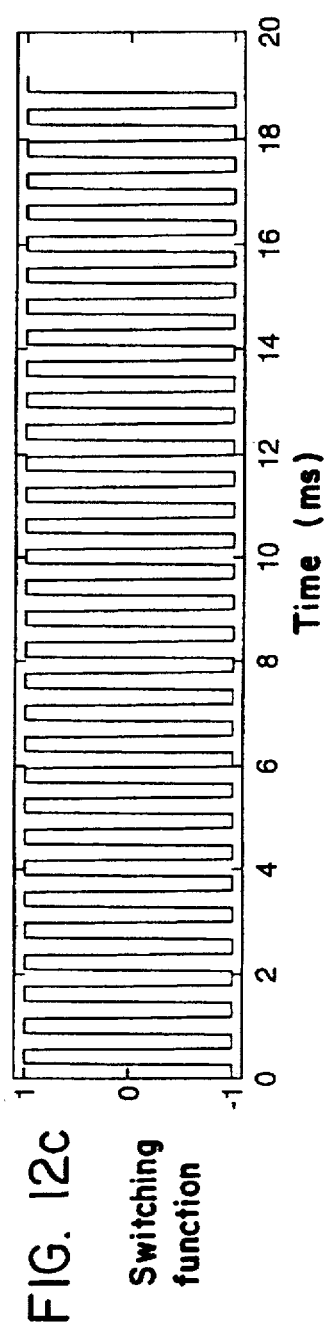
FIG. 12a
FIG. 12b
FIG. 12c

SWITCHED CAPACITOR SYSTEM FOR AUTOMATIC BATTERY EQUALIZATION

FIELD OF THE INVENTION

The invention pertains to systems and methods for battery equalization. More particularly, the invention pertains to such systems which incorporate switched energy storage elements.

BACKGROUND OF THE INVENTION

Series strings of storage batteries are extensively used in the telephone industry, the utility industry, and in military applications. Series strings are expected to be used in forthcoming electric vehicles and new power backup applications. The ability to uniformly charge the batteries in such strings is very important in these situations.

If a series string is charged as a unit, slight mismatches or temperature differences between batteries cause charge imbalance. Once imbalance occurs, it tends to grow with time. "Charge equalization" cycles must be used in an attempt to correct imbalance. It has been recognized that such processes stress the batteries, shorten their lives (by factors of three or more in some applications), and are not always effective.

Users of battery strings have long been aware of the charge of imbalance problems associated with series charging, although it is only recently that imbalance has been considered to be a major limiting factor. The extent of the problem depends on the specific application.

The telephone industry commonly uses series strings of at least 24 cells. Often, one or more cells will fail prematurely, possibly because of long-term effects of imbalance.

One electric vehicle scheduled for commercial introduction late in 1996 uses more than 150 cells in series. If such vehicles are ever going to be commercially successful, the imbalance problem must be minimized or eliminated.

During the charging process, an imbalance will cause some cells to be undercharged while others will be overcharged. The operation of a series string is limited by the weakest cell, so local undercharging is a problem.

The desire for a rapid-charge capability in the electric vehicle industry will exacerbate problems caused by the imbalance. It is well known that fast charging is more likely to create imbalance than slow "trickle" charging. Even a few tens of millivolts of voltage imbalance will tend to alter the charge process so that imbalance increases over time.

In practice, charge balance, or "equalization," must be carried out periodically to avoid long-term severe imbalance. Equalization is most often performed by extending the charging process. Using this approach, the cells having the highest voltage are forcibly overcharged while those having lower voltages are brought up to full charge.

In lead-acid, nickel-cadmium, nickel-metal hydride and other common rechargeable technologies, the overcharge process produces hydrogen gas, and tends to remove water from the highest cells. Over repeated cycles, the loss of water, as well as side reactions during the overcharge process, degrades the performance and shortens the useful life of the cells.

Many battery manufacturers attempt to minimize imbalance troubles within a single package through gas and moisture exchange mechanisms. This approach has limitations, but it allows a series string to be constructed with individual battery packages rather than individual cells.

In lead-acid batteries, 10 V or 12 V packages are often treated as internally balanced for purposes of the equalization process. Existing technologies cannot effectively support cell-by-cell equalization because of the tight tolerances and high costs.

The deliberate charging extension method is termed passive equalization. In the literature, active equalization methods have been proposed in the past few years. In S. Hung, D. C. Hopkins, C. R. Mosling, "Extension of Battery Life via Charge Equalization Control," *IEEE Trans. Indus. Electronics*, v. 40, no. 1, pp. 96–104, Feb. 1993, three alternatives were described.

The first diverts charging current around high batteries. This process causes energy loss, and can be used only when efficiency is not important. This method is impractical in industrial and commercial applications since excess charge is dissipated as heat.

The second uses a set of power converters to send charge selectively to weaker cells. The third uses a set of power converters to divert charge away from stronger batteries, but returns the energy to the full series string with minimal loss. The second and third methods are costly, and require precise control to match battery voltages in a long string.

One reported approach is based on the second active method defined above. This technique uses a special transformer to provide accurate matching for equalization purposes. The tolerance issues and costs associated with this approach are significant drawbacks, particularly in high-volume cost-sensitive applications such as cars or communication systems. The complexity makes it unlikely that the technique could be extended to cell-by-cell equalization.

Another approach under development addresses the third active method. In effect, individual switching power converters are provided for each battery. This has limited practical value in long strings, because of cost and the possibility of mismatch between converters.

A fourth active method appears in U.S. Pat. No. 5,479,083, granted to G. L. Brainard. According to this method, a dc—dc switching power converter of the buck-boost type is connected to transfer energy among two adjacent bakeries in a series string.

Brainard's converter can provide an equalization function if the voltage difference between adjacent batteries is sensed, the inductor current in the converter is sensed, and a feedback control system is used to vary the inductor current according to the voltage difference. Multiple converters of this type can equalize a complete series string if the switch action is tightly coordinated.

An important limitation of this fourth method is the need for very precise control. Switching signals must be arranged so that the durations of two separate clock signals match closely, subject to a half-period phase shift. Feedback control is necessary because small mismatches in switch components or timing can produce high inductor currents or even cause magnetic saturation. In U.S. Pat. No. 5,479,083, Brainard is explicit about the need for switching signals of substantially equal duration.

Another limitation of the fourth method is that is control action does not naturally lead to a null condition: the converter will still exchange some energy when the batteries match precisely. This small continuous exchange will consume energy. Still another limitation concerns component values. A specific inductor value will be needed for a given clock frequency and equalization current. The control must maintain operation within a narrow range to ensure successful equalization.

All prior art approaches except the fourth active method perform equalization only at the conclusion of the charging process. Equalization cannot commence until at least one battery has reached full charge, and does not conclude until all batteries have reach full charge. The electric vehicle application is an important case in which batteries might cycle many times without reaching full charge. Rapid charging is not normally practical to produce a full charge because it is inefficient at high charge levels. Slower charging methods might not have sufficient time to complete the equalization process while a vehicle is parked.

Thus, there continues to be a need for cost effective, reliable systems and methods of battery equalization. Preferably, improvements in battery equalization will be achieved without having to resort to complex circuitry and without having to shorten the life of some of the cells.

A practical apparatus and method should be capable of equalizing batteries during a charge cycle, during battery discharge, or during idle times. It is very desirable to avoid sensors or precise control so that simple, reliable, low-cost equalization circuits can be built. Preferably, no battery energy should be exchanged when the equalization process is complete. A preferred apparatus and method will operate over a wide range of conditions with little or no change.

SUMMARY OF THE INVENTION

A switched-capacitor system and method of battery equalization provide improved battery life. A group of capacitors is used to shift charge among adjacent series coupled batteries. Alternately, an individual capacitor can be used to shift charge between two batteries arranged so one battery backs up the other.

When the capacitors are switched back and forth repeatedly, they bring the battery voltages in an arbitrarily long series string to equal values. The equality is dependent of capacitor value, switching speed, component values, level of change, and even battery chemistry.

The method can be implemented with low-cost components. In many applications it is expected to extend battery life by a factor of two or more. In highly stressed applications, such as electric vehicles, the life extension in battery life will be even more significant. This extension will bring substantial reductions in overall system cost.

In accordance with the invention, if two batteries have unbalanced voltages, a capacitor which is switched between them will extract charge from the battery having a higher voltage and deliver charge to the battery having a lower voltage. When the switching process is performed at high frequency, significant charge redistribution will take place, and equalization will occur in time periods of minutes or hours.

The capacitor value is not relevant to the final result, but only to the rate of charge exchange. The switching process is not critical, except that it must be fast, and the switches must exhibit essentially zero voltage drop as the current decreases to zero. When these requirements are met, the process provides voltage equalization between batteries along with the expected extended life.

The present system and method are usable irrespective of the battery technology. Voltage will be matched between adjacent batteries regardless of chemistry, manufacturer, or capacity.

The present switched capacitor (or capacitor-inductor) method can be used with long series strings of batteries or even individual cells without limit. Given n batteries in series, a string of n−1 capacitors can be switched back and forth between adjacent cells.

Since the capacitors exchange charge among adjacent batteries until they exhibit the same voltage, the full capacitor string redistributes charge until the other voltages for all batteries match. Similar comments apply to systems that combine capacitive and inductive storage elements.

In one aspect of the invention, a plurality of identical equalizing modules could be provided. The modules can be coupled to a plurality of batteries to be equalized.

In yet another aspect of the invention, a rechargeable vehicular drive system is provided. In yet another, a telecommunications back-up system is provided.

The system and method yield a low cost implementation. Conventional power MOSFETs meet the requirements for the switching hardware. The rating and capabilities are not critical, and low-cost devices are suitable. Retail prices of basic MOSFETs are now approaching $0.50 per unit.

Each switch needs to block only the voltage of a single battery—rarely more than 12 V. The capacitors also require only 12 V ratings, but should be chosen for high reliability and long life. Appropriate capacitor values will be in the range of 20 $\mu$F to 1000 $\mu$F. These values are well-represented in existing mass-produced capacitors.

Switch control can be implemented in a variety of ways. Both optical and magnetic coupling methods can be used. Control elements could be implemented with inexpensive programmed microprocessors, although no separate control unit is needed in most cases.

Advantages of the present system and method include:

1. Precise equalization is achieved without any requirements for device matching or tight tolerances. This contrasts strongly with active methods that can equalize only if several different circuits match precisely.
2. No sensing is needed.
3. There is no need for closed-loop control.
4. An identical implementation can be used in almost any situation. For example, a switched-capacitor equalization circuit will work with lead-acid batteries, nickel-cadmium batteries, nickel-metal-hydride batteries, or other conventional rechargeable chemistries. No change of any kind, and no adjustment or recalibration, will be necessary.
5. Circuitry and control are simple and inexpensive. Diagnostic circuits have been proposed in some applications, and are likely to be about as costly as the new equalization approach.
6. The concept is modular, and extends to arbitrary numbers of batteries. Modules could be provided as battery accessories, or could be packaged directly with individual batteries or individual cells. It would not matter if modules for different batteries have different values of capacitance, use different MOSFETs, or have other mismatches in electrical characteristics. Batteries can be added without any system redesign by providing each additional battery with a module.
7. The equalization process can be performed during the main charging process or separately. If desired, it can be performed continuously during battery operation with minimal power drain. Equalization takes place without regard to level of change.
8. The process does not interfere with safety or protection systems, since charge is exchanged rather than delivered, very little energy is manipulated at any given time within the equalization circuits.
9. A single system could be designed for a broad range of nominal battery voltages. A single circuit can equalize batteries rated from 12 V to more than 36 V, for example.

10. The process is self-limiting. When equalization is complete, continued switching of the capacitors consumes no energy, exchanges no charge, and has no further effect.

Numerous other advantages and features of the present invention will become readily apparent from the following detailed description of the invention and the embodiments thereof, from the claims and from the accompanying drawings in which the details of the invention are fully and completely disclosed as a part of this specification.

BRIEF DESCRIPTION OF THE DRAWINGS

FIG. 1 is an overall block diagram illustrating a system and a method in accordance with the present invention;

FIG. 2 is a more detailed schematic of a portion of the system of FIG. 1;

FIG. 7a is a block diagram illustrating a general application that makes use of the circuit of FIG. 1;

FIG. 7b is a schematic diagram of a single pole switch useable with the circuits of FIGS. 1 and 7a;

FIG. 8 is a block diagram of an equalizer system with asynchronous control;

FIG. 12a–12c are graph illustrating an accelerated simulation of an equalizing method with 2 batteries, using the system of FIG. 11;

DETAILED DESCRIPTION OF THE PREFERRED EMBODIMENT

Figure 3:
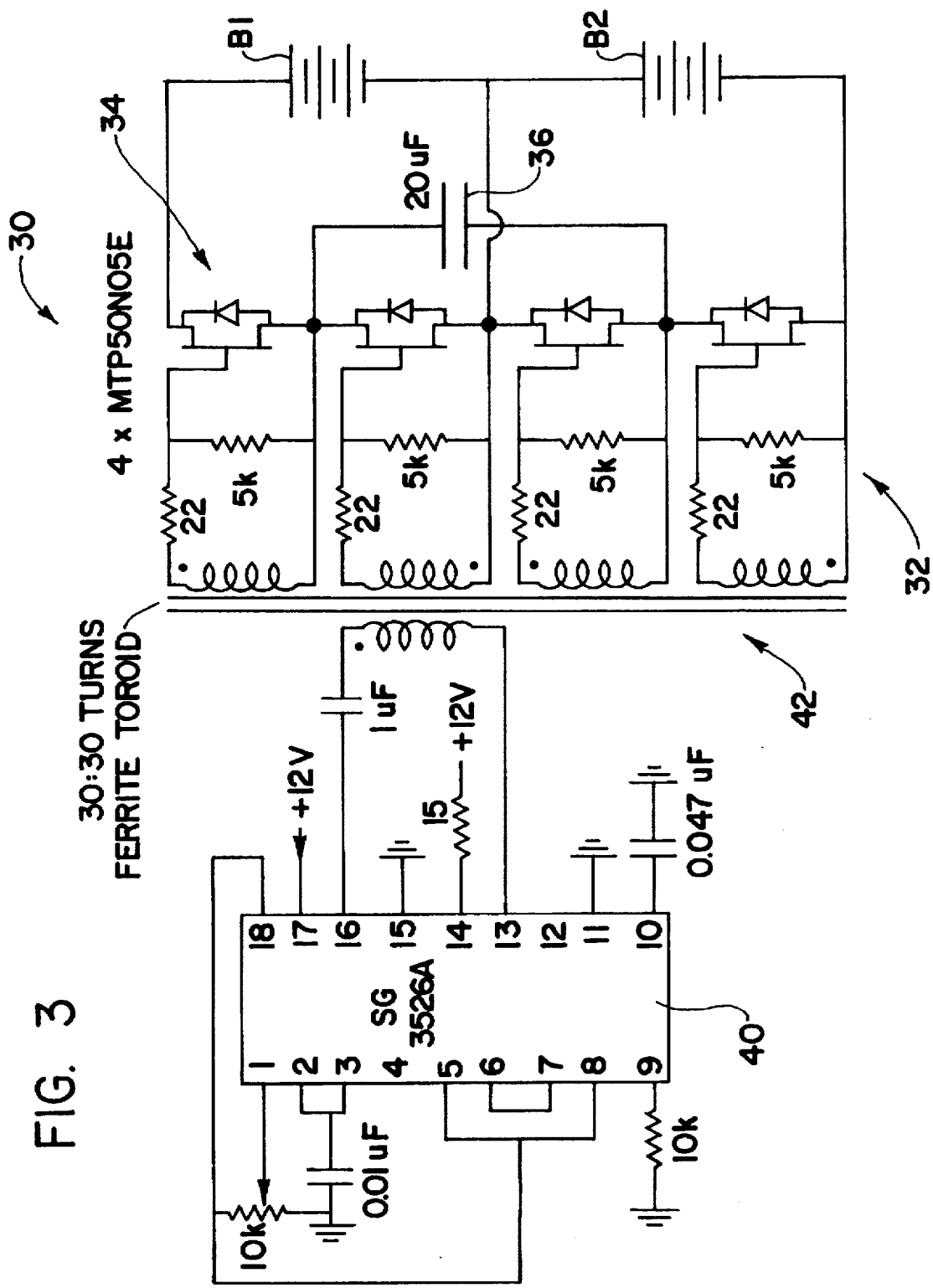
FIG. 3 is a schematic diagram of a modular equalizing circuit in accordance With the present invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

FIG. 1 illustrates a schematic diagram of a system 10 in accordance with the present invention. The system 10 is intended to be used with a plurality of series connected batteries indicated generally at B.

The batteries B are intended to provide electrical energy to a load L. The batteries B are also intended to be recharged from recharging circuitry R.

The load could be, for example, an electric motor and associated drive electronics for an electric powered vehicle.

The system 10 includes a control unit 12. A plurality of capacitors 14, having members 14a, 14b, ... 14g, all of which are coupled together in series, is in turn coupled to a plurality of switches 16. The control unit 12, via control lines 18, provides signals to the members of the plurality of switches 16.

In a representative embodiment, the control unit is simply a clock signal to command the switches to take their upper and lower positions, sequentially. The "up" and "down" clock phases, denoted q and $\bar{q}$ in FIG. 1, are connected to the switches through control lines 18. The clock phases must be separate in time. However, their durations need not match, and no particular durations as required. It is desirable to provide a brief dead time between the phases to prevent any possible overlap or momentary short circuits.

The members of the plurality of switches 16, such as switch 16a, can be switched from a first state, illustrated in FIG. 1, to a second state, illustrated in phantom in FIG. 1. In the first state, a pole connection 16a-1 is electrically connected to an anode of battery Ba. In a second state, the pole element 16a-1 of the switch 16a is electrically coupled to a cathode of the battery Va and simultaneously to an anode of the battery Bb. Other switches of the plurality 16 function the same way in response to signals from the control unit 12.

The members of the plurality 16 change state at the same time and alternately connect as illustrated to an anode and a cathode of a respective battery. As a result of the series connection of the members of the plurality B and the inter-related connections of the members of the plurality 16, charge will be transferred between batteries from those having higher voltage levels to those having lower voltage levels. After a period of time depending on the level of imbalance, size of the capacities and related factors noted above, each member of the plurality of batteries B will exhibit substantially the same voltage.

The circuitry of FIG. 1 is advantageous in that it requires very few components. In addition, it has the further benefit that standard commercially available capacitors and solid state switches can be used in an implementation.

FIG. 2 illustrates a detailed implementation of a portion of the system 10 of FIG. 1. Each of the members of the plurality of switching elements 16, such as the elements 16a and 16b can be implemented by means of first and second MOFET-type transistors.

The switching transistors such as elements 16b-2 and 16b-3 must be selected so that they do not exhibit a voltage drop at the end of a capacitor charge operation. The transistors must be capable of charging a relatively large capacitor in only a few microseconds. Further, the transistors must be capable of switching in respond to control signals from the unit 12 having rates on the order of 10 kilohertz greater.

The circuitry of FIG 2. could be implemented on a modular basis. For example, a module Mb, illustrated in phantom i FIG. 2, could be implemented with capacitor 14b and switches 16c-2, 16c-3. In such an implementation, one of the end modules would need a second set of solid state switches. Other modular arrangements are possible.

FIG. 3 illustrates an alternate, modular, form of a system 30 in accordance with the present invention. The system 30 incorporates a bridge-type structure 32 having a plurality of solid state switches 34 for the purpose of equalizing voltages on batteries B1 and B2. The system of 30 requires only a single capacitor 36.

A control element 40 generates a clock signal. This signal via transformer 42 gates the switching transistor 34 such that charge is transferred back and forth between the batteries B1 and B2 thereby equalizing the voltages thereof. The control element 40 could be implemented as an SG3526A pulse width modulation power convertor control element. The system 30 could be replicated for each pair of batteries. All such modules will operate independently of one another.

Figure 4:
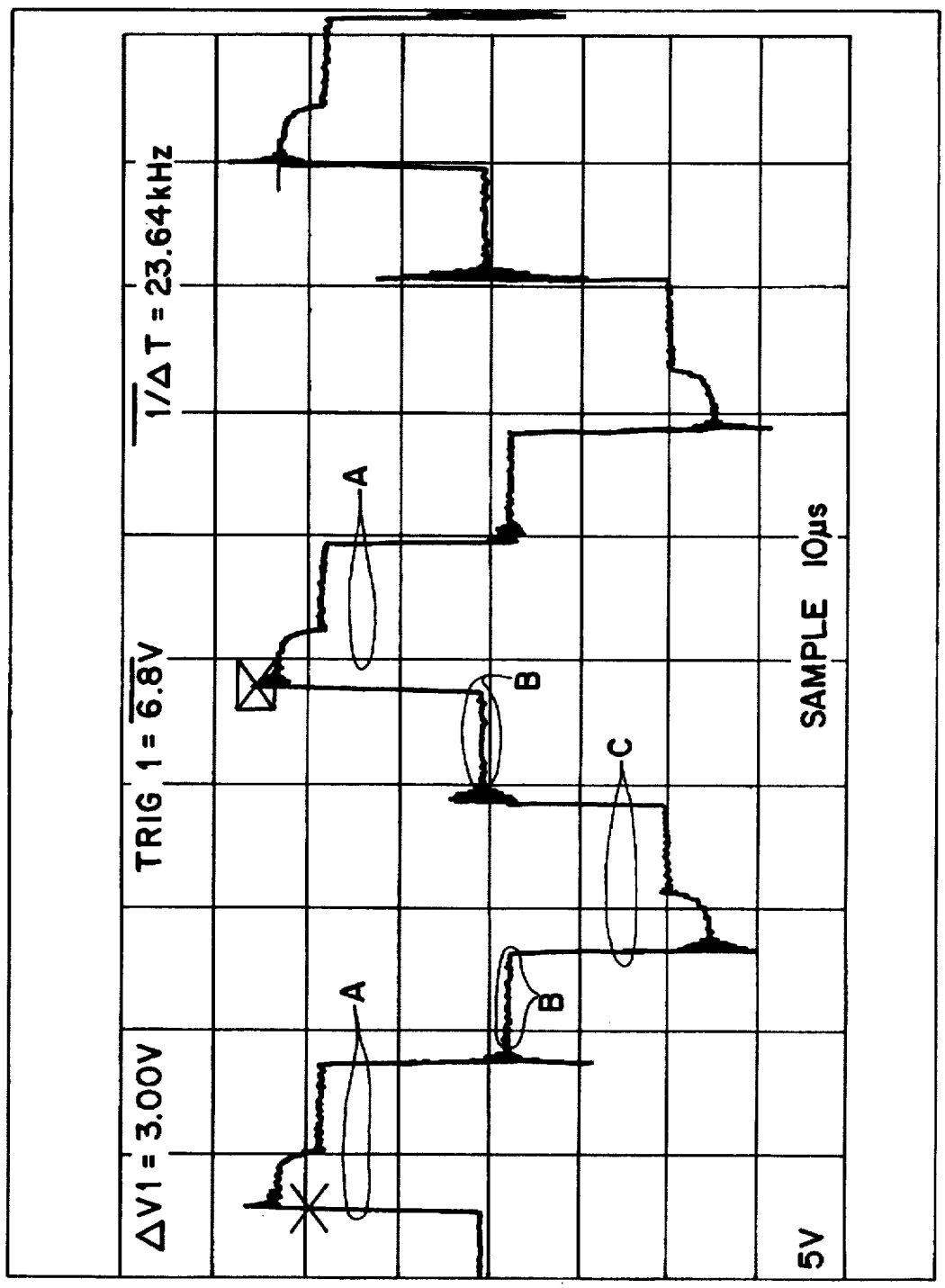
FIG. 4 is a graph illustrating an exemplary clock signal measured at the primary side of the transformer of the control circuit of FIG. 3.

FIG. 4 is a graph illustrating the clock signals generated by the control circuit 40, in FIG. 3. The graph of FIG. 4 illustrates the waveform across the primary of the transformer 42.

As illustrated in FIG. 4, the clock signals have a time interval A wherein the capacitor 36 is coupled across one of the two batteries, B1 or B2. The time interval A is then followed by a time interval B wherein all of the solid state switches 34 are turned off to avoid short circuits and the like. The "dead time", interval B insures that all currents from interval A have ceased flowing. The time interval B is subsequently followed by a time interval C wherein the capacitor 36 is coupled across the other of the two batteries B2 or B1. The time interval C is then followed by another off time interval B and the process continues.

Figure 5:
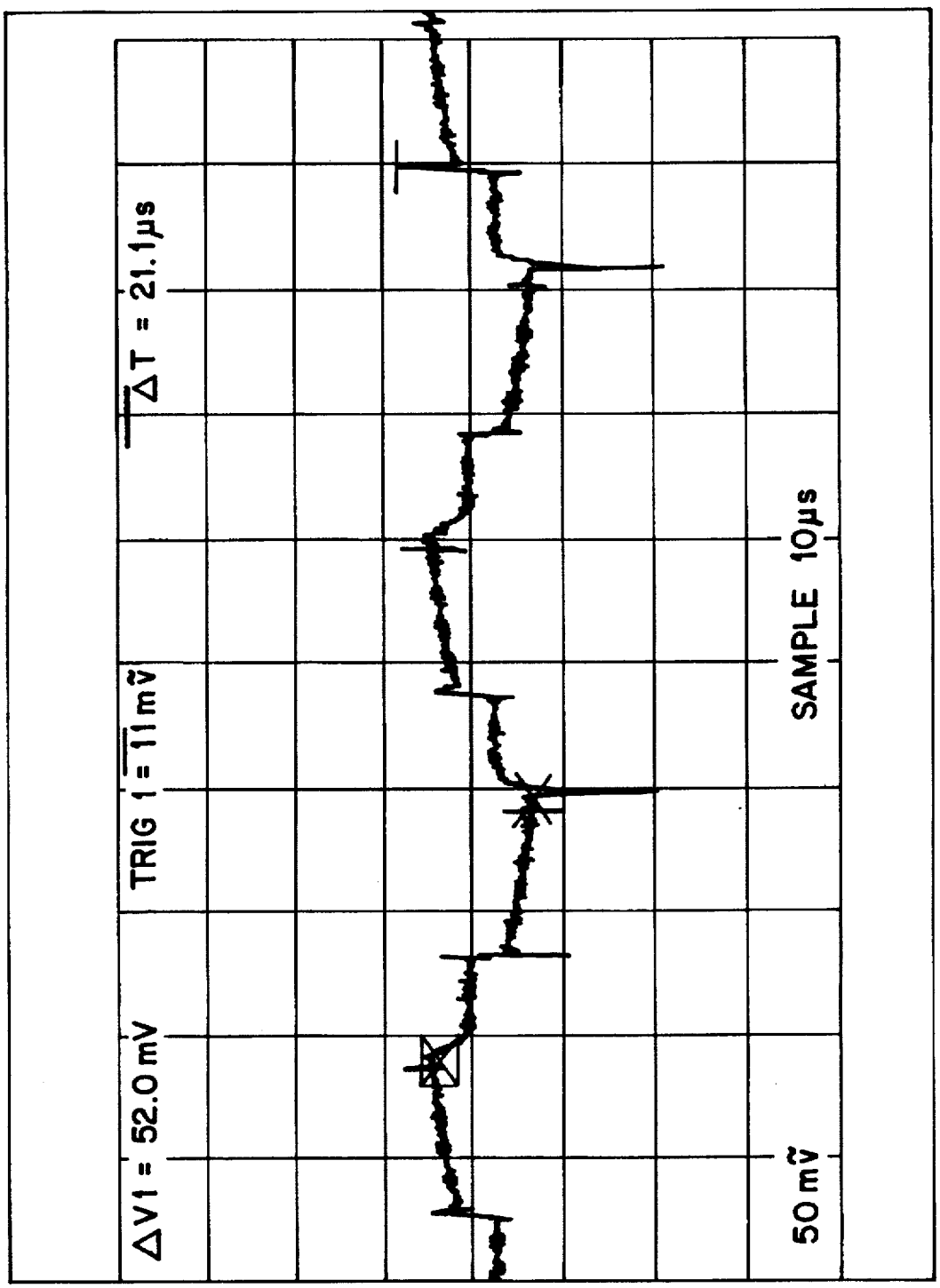
FIG. 5 is a graph illustrating voltage variations in the storage capacitor of the circuit of FIG. 3.

FIG. 5 illustrates the changing voltage across the capacitor 36 as the different voltages of battery B1 and B2 are being equalized, in accordance with the above-described clock signal from FIG. 4.

Figure 6:
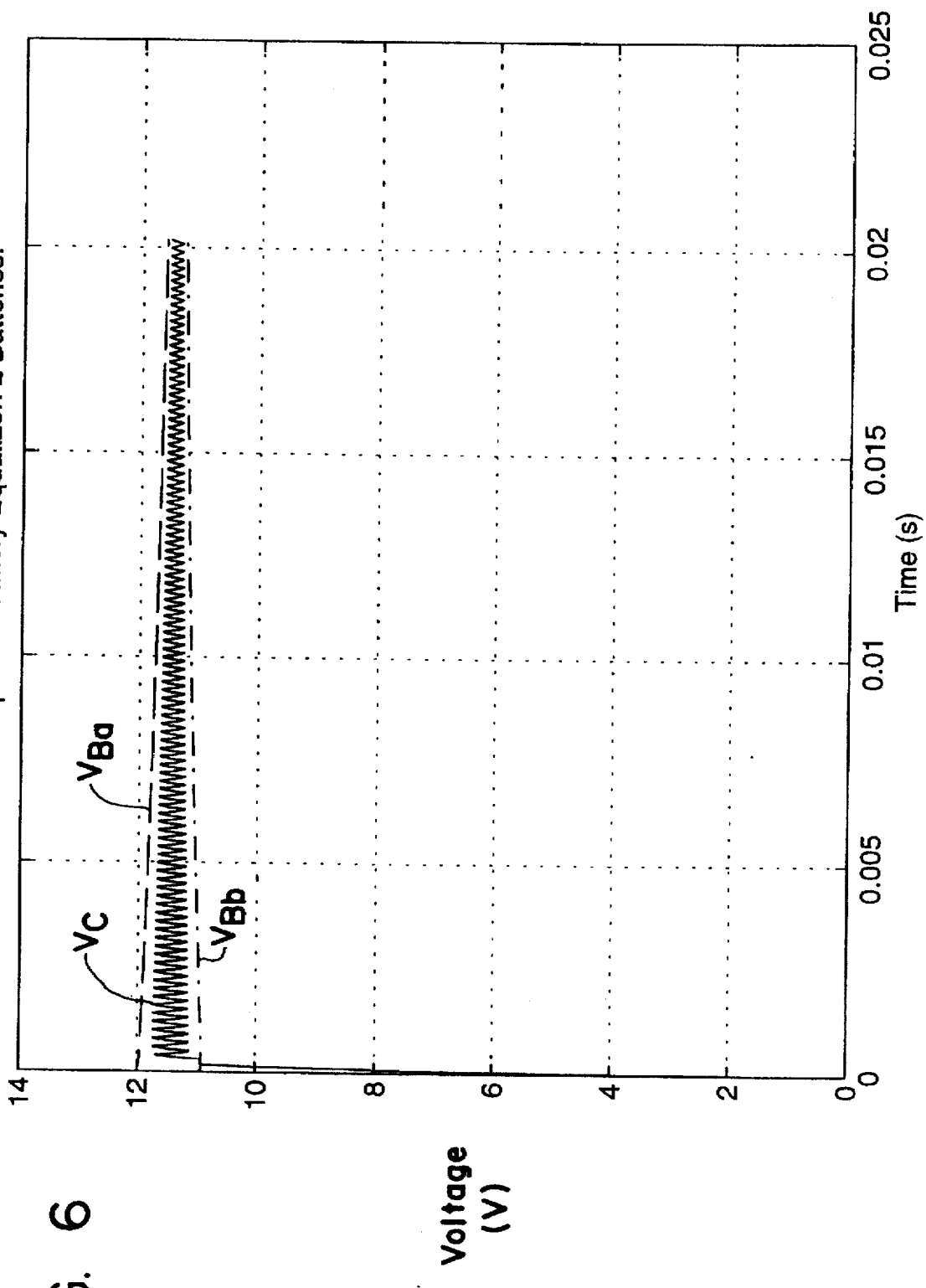
FIG. 6 is a graph based on an accelerated simulation of charge transfer between batteries using a circuit of the type illustrated in FIG. 3, where low capacity batteries are being equalized.

FIG. 6 is a graph of an accelerated simulation of change transfer and equalization between two batteries, such as the batteries B1 and B2 in a circuit of the type illustrated in FIG. 3. While FIG. 6 is a simulation, it illustrates a process of battery equalization in accordance with the present invention.

The simulation of FIG. 6 is based on equalizing charge between two batteries which start with a one volt variation therebetween, for example, battery B1 initially starts at 12 volts and battery B2 initially starts at 11 volts. The graph of FIG. 6 is based on the assumption that the batteries B1 and B2 are of relatively low capacity. The only difference if a simulation were run with high capacity batteries, would be that the time interval necessary to equalize the batteries would increase. Otherwise the process would be the same.

Sandwiched between the approaching voltages of the batteries B1 and B2 is a simulated graph of the varying voltage across a capacitor such as the capacitor 36 of FIG. 3. For purposes of the simulation in FIG. 6, a capacitor value of 1000 microfareds was selected. The switching frequency was set at 5000 hertz.

FIG. 7a is a more detailed block diagram of the system 10 illustrated in FIG. 1, but limited to four batteries. The limitation of four batteries is exemplary only and is not a limitation of the present invention.

The master clock unit 12a illustrated in FIG. 7a represents the function of the control unit 12 of FIG. 1. The systems of FIGS. 1 and 7a incorporate a single synchronized control unit 12 which provides a common master clock on lines MC1, MC2. Those signals correspond generally to the gate signals G and G̅ illustrated in FIGS. 1 and 2.

Figure 7B:
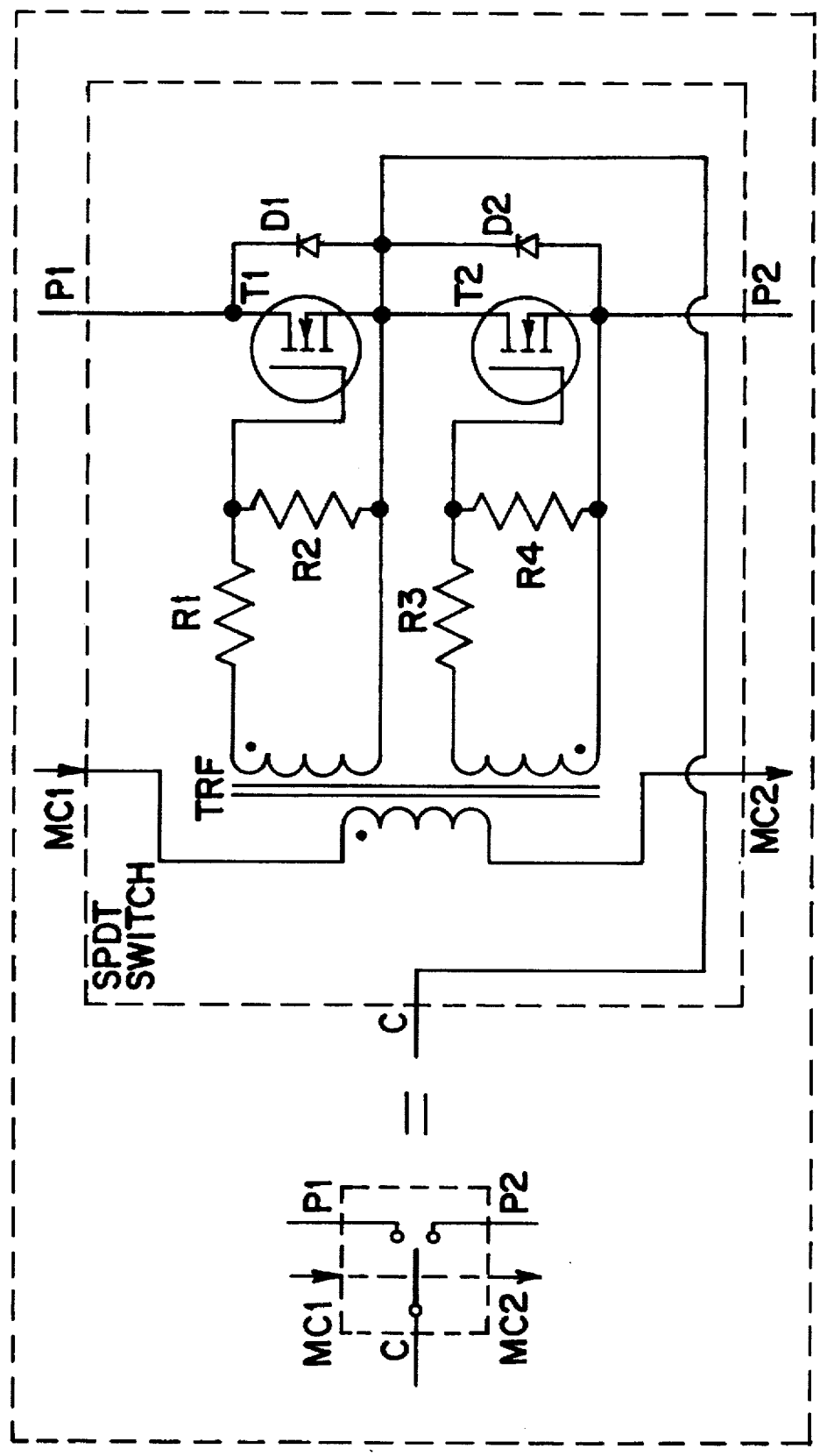

FIG. 7b is a schematic diagram of one of the single pole, double throw switches illustrated in FIG. 7a. While neither FIG. 1 nor FIG. 7a are explicitly configured to illustrate a modular arrangement of capacitors and associated switches, it will be understood that, as previously discussed with respect to FIG. 3, either one of those systems could be configured modularly. In a modular configuration, each of the capacitor/switch modules could be arranged with a plug so as to be releasably engageable with the system for maintenance and test purposes.

FIG. 8 illustrates an alternate form of an equalizing system 60 which incorporates an asynchronous control strategy. The system 60 includes control units 62a, 62b and 62c. Each of the control units 62a–62c generates an independent clock 64a–64c. While the system 60 illustrates equalization of four series connected batteries, it will be understood that the number of batteries being equalized is not a limitation thereof.

Figure 9:
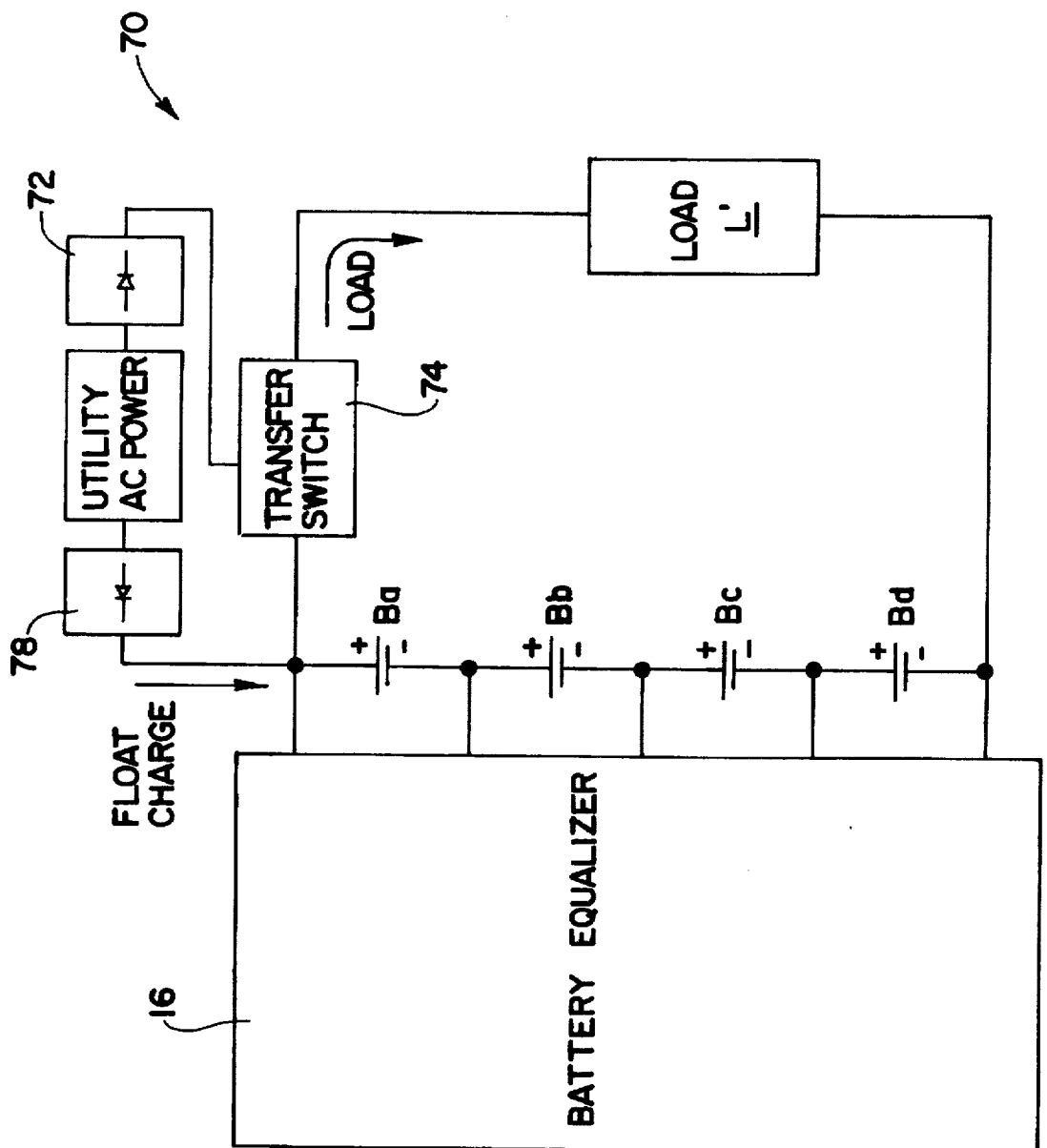
FIG. 9 is a block diagram of an equalizer circuit configured for use in a telecommunications backup application.

FIG. 9 illustrates an equalizer system, such as the system 16, for example, used in a system 70 where batteries provide backup in the event of a failure of utility supplied AC power. Typical examples include backup systems found in telecommunications and data processing systems so as to maintain operational, data and service integrity of such systems when there has been a failure of utility supplied AC power.

As illustrated, the system 70 incorporates only four series connected batteries. It will be understood that such are exemplary only and the system is not limited by the number of series connected batteries.

In normal operation, utility supplied AC power is rectified and filtered in circuitry 72. The rectified and filtered DC energy is then supplied via a transfer switch 74 to power the load L'. Simultaneously, rectifier and circuitry 48 is provided, powered by the normal utility supplied AC energy, to provide a trickle-type float charge to a battery bank, Ba–Bn.

The battery equalizer functions as described above to continuously equalize the voltage appearing across the series connected plurality of batteries.

In the event of a power failure, the transfer switch 74 switches to the backup battery bank for purposes of driving the load L'. During this time, the battery equalizer system 16 continues to function to equalize the voltage present on the series connected batteries.

It will be understood that each of the batteries illustrated in the system 70 could itself be a composite of a plurality of batteries which were connected together in parallel to provide increased energy storage capacity. It will also be understood that the system 16 could be configured to equalize voltages on two separate batteries, wherein one of the two batteries is a primary battery, and the other is a backup battery.

Figure 10:
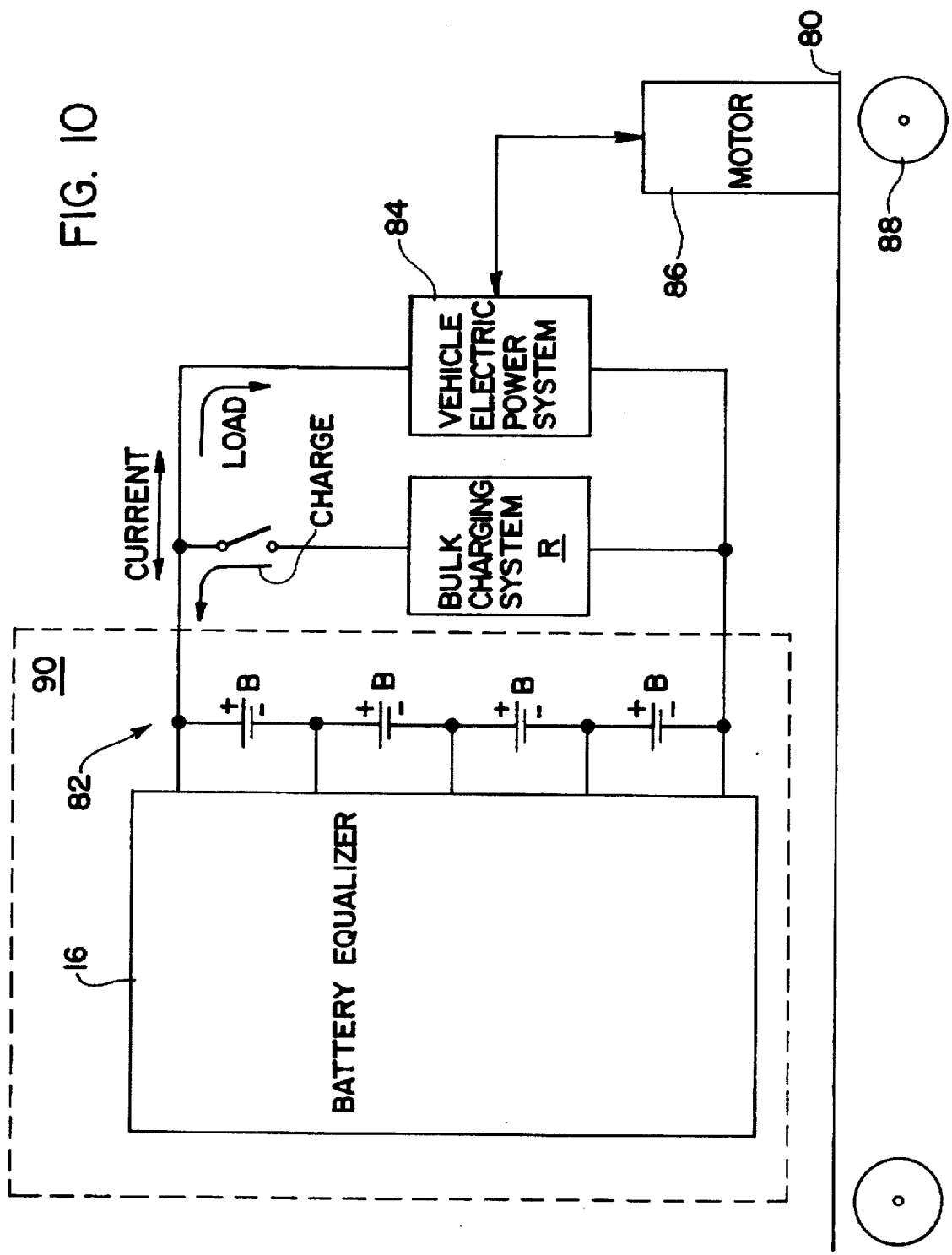
FIG. 10 is a block diagram of an electric vehicle incorporating an equalizer system as in FIG. 1.

FIG. 10 is a block diagram of an electrically powered vehicle 80 which incorporates a battery equalization system 16 of the type illustrated in FIG. 7a. The vehicle 80 further includes a plurality of series connected rechargeable drive batteries 82, a recharging system R, and electric power system circuitry 84. The circuitry 84 is in turn coupled to one or more drive motors 86 which are energized to turn one or more of the wheels 88 of the vehicle to move same.

The equalizer 16 could be installed within or carried on a battery pack housing indicated generally at 90. The housing 90 could be itself configured as a removable module for maintenance and test purposes.

Figure 11:
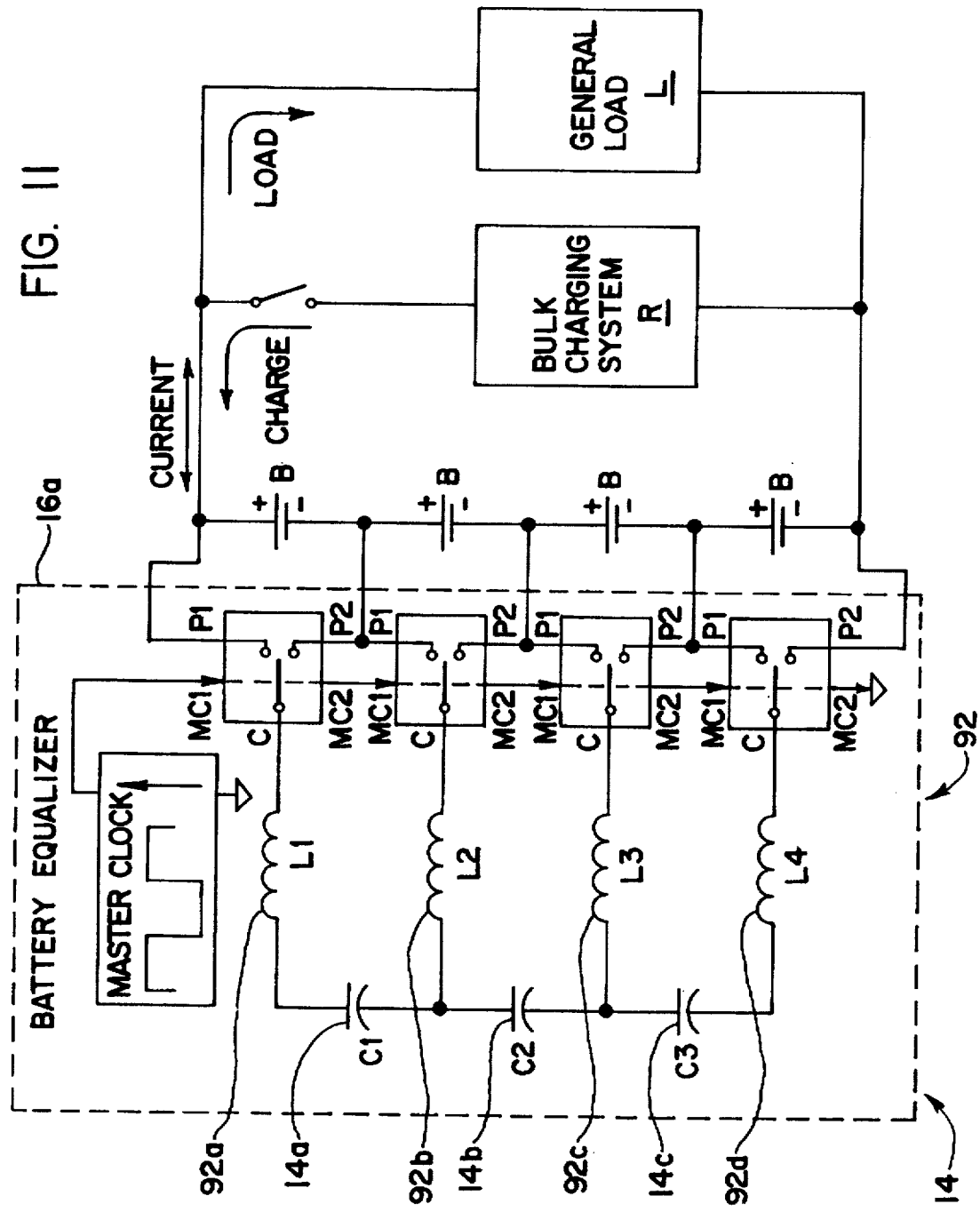
FIG. 11 is a block diagram of an equalizer system incorporating inductors for efficiency improvement.

FIG. 11 illustrates a system 16a which is a variation of the system 16. The system 16a incorporates a plurality of inductors 92. Each member of the plurality of inductors 92 is coupled to a respective capacitor. The inductors 92 in combination with the associated capacitors provide circuits which exhibit resonant-like characters. As such, the peak currents which flow to and from the respective capacitors will be larger than in equalizer systems without inductors. Because of the resonant characteristic the current flows will now exhibit zero crossings. Switching can in turn be carried out at the current zeros to avoid losses encountered in the switching process.

FIGS. 12a through 12c are graphs illustrating a process of equalizing two series coupled batteries using an equalizing system as in FIG. 11, such as the system 16a, wherein each storage capacitor has an inductor coupled thereto. In the process illustrated in FIGS. 12a through 12c, the inductor has a value of 100 μH, the capacitor has a value of 100 μF. The frequency of the master clock signal is 1.67 kHz.

As is illustrated in FIG. 12a, the voltages across the 2 batteries, VBa and VBb are illustrated as varying and tracking toward one another in response to the capacitor C1 being alternately switched across one battery to the next. The voltage across the capacitor, VC1 is also illustrated in FIG. 12a.

FIG. 12b illustrates the current through capacitor C1 and inductor L1 in response to the switching and equalizing process. As described previously, the inductor L1 produces current peaks and current zeros during the process.

FIG. 12c illustrates the waveform of the master clock, see FIG. 11. Switching takes place only at zero crossings of the capacitor current, illustrated in FIG. 12b. The switching waveform 12c can be provided with a third "dead time" state as previously illustrated in connection with the switching waveform of FIG. 4. However, the inductors prevent high current flows in the event of a momentary short circuit, so the dead time is not essential.

Figure 13:
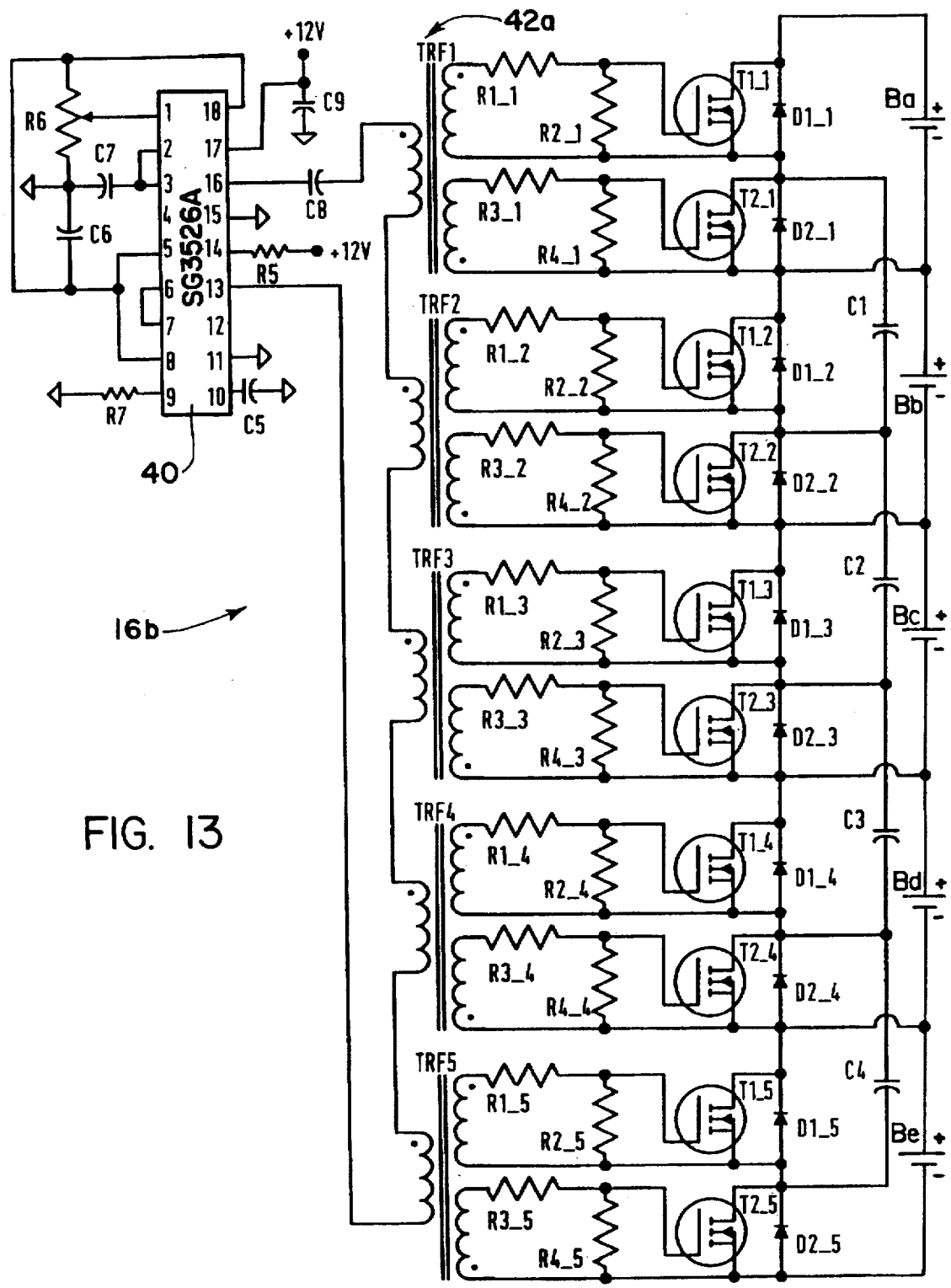
FIG. 13 is a schematic diagram of an equalizer system for five series connected batteries.

FIG. 13 is a schematic diagram of an equalizer system, 16b, such as the system 16 of FIG. 7a. For exemplary purposes only, the system 16b is illustrated equalizing five batteries Ba–Be.

The system 16b incorporates a control element 40 of the type illustrated in connection with the system of FIG. 3. The system 16b also incorporates a multiple coil transformer 42a similar to the transformer 42 of FIG. 3.

The equalizing capacitors and solid state switches of FIG. 7b have been incorporated into the system 16b. As can be seen, a string of N batteries can be equalized using a single controller with a synchronized clock signal. A total of N single-pole, double-throw switches and N–1 capacitors is required in this implementation.

Figure 14A:
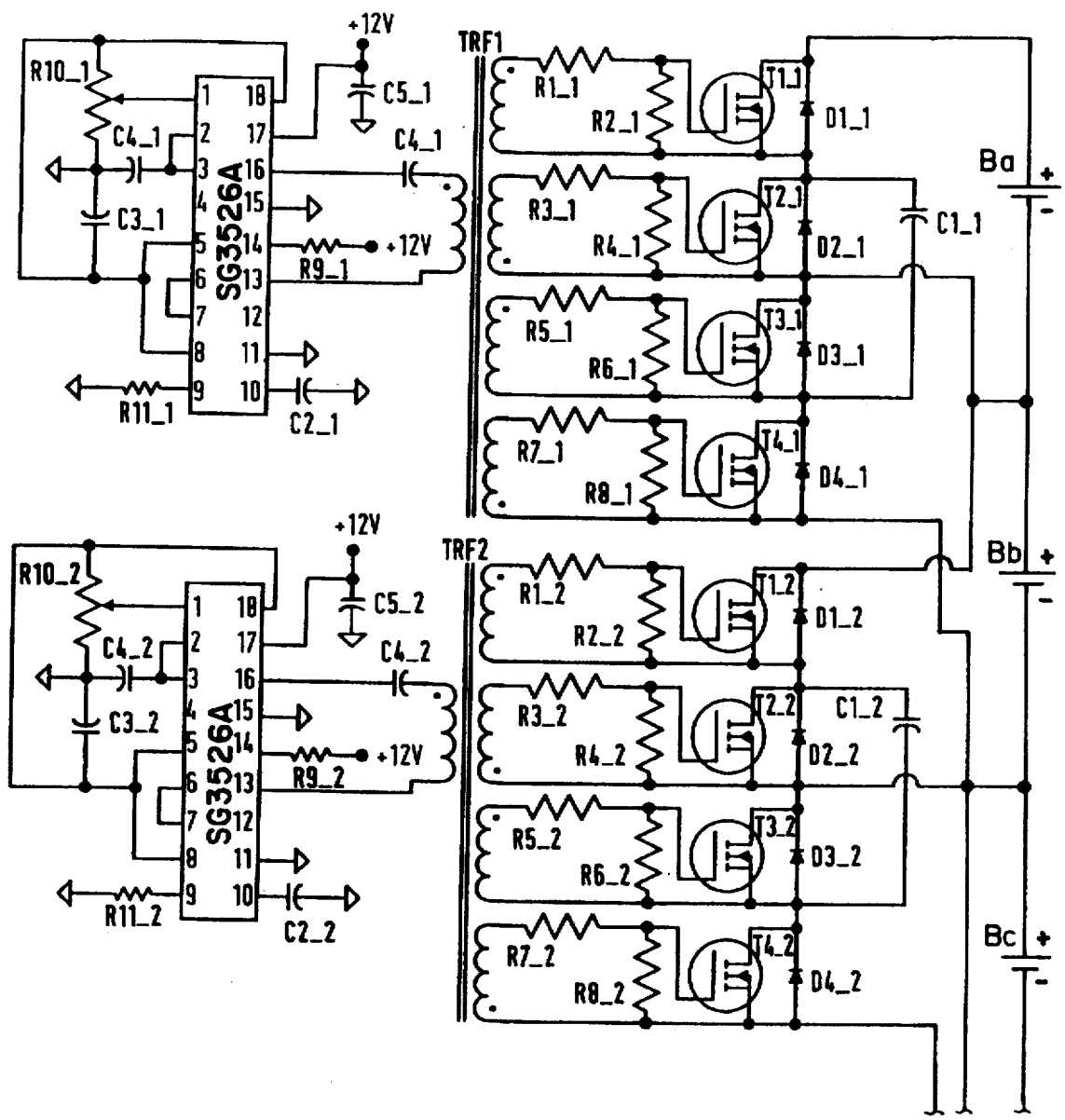
FIG. 14 is a schematic diagram of an equalizer system with asynchronous control, for five series connected batteries.
Figure 14B:
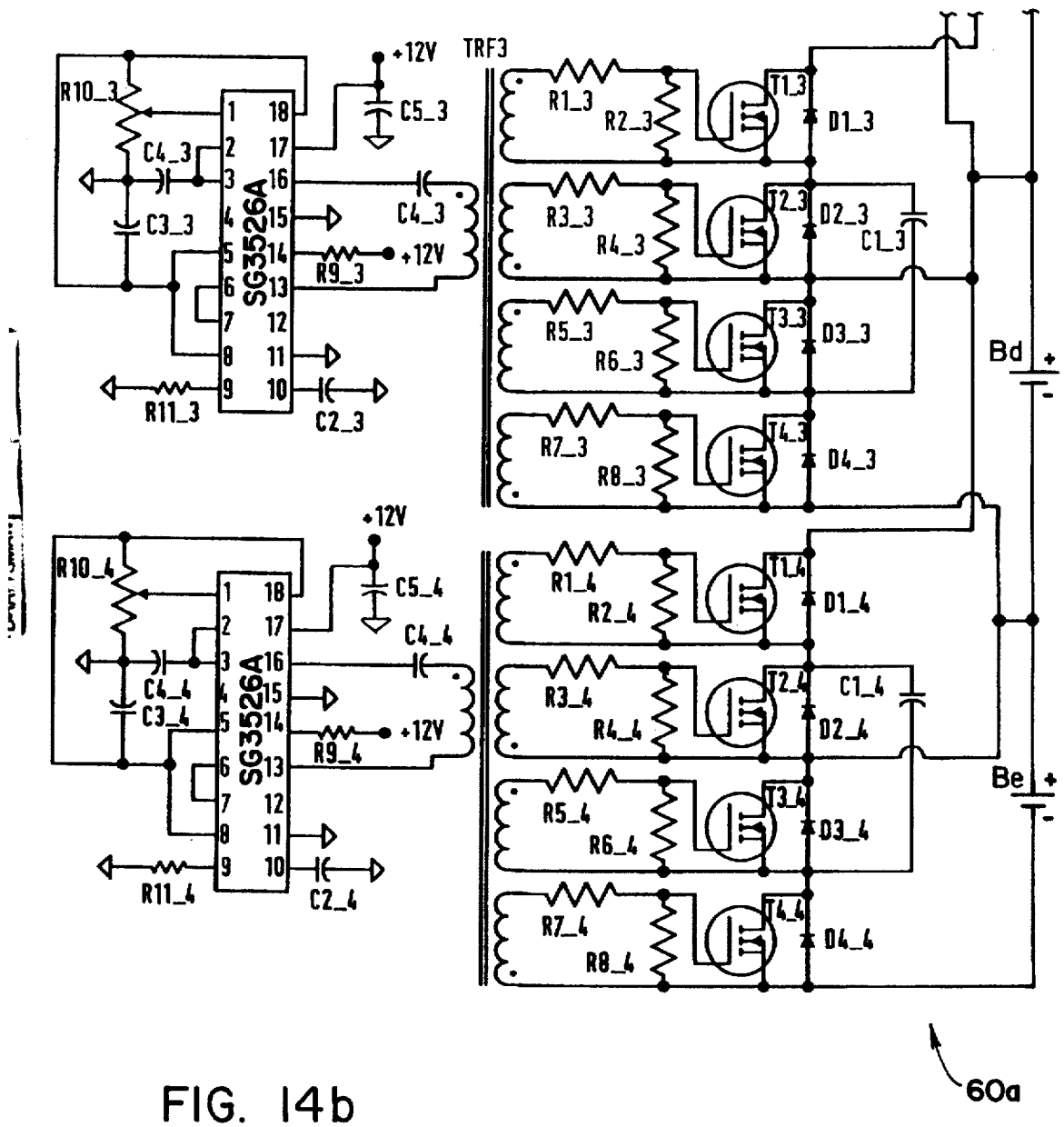

FIG. 14 illustrates a schematic of a system 60a corresponding to the system 60 of FIG. 8. The system 60a, for exemplary purposes only, is illustrated equalizing a string of five series connected batteries using an asynchronous control arrangement. In this circuit configuration, N batteries require N–1 independent controllers and 2N–2 single-pole double-throw switches as illustrated in FIG. 14.

It will be understood that the systems of FIGS. 13 and 14 could be arranged on a modular basis as previously discussed.

In summary, the importance of good battery equalization has now been recognized. The present systems and methods provide solutions that make use of commercially available components. The result is a very flexible family of equalizers that will provide significant benefits in most multi-battery storage applications.

From the foregoing, it will be observed that numerous variations and modifications may be effected without departing from the spirit and scope of the invention. It is to be understood that no limitation with respect to the specific apparatus illustrated herein in tended or should be inferred. It is further to be understood that "batteries" can refer to individual battery cells as well as to conventional batteries. It is, of course, intended to cover by the appended claims all such modifications as fall within the scope of the claims.

We claim:

1. An apparatus for equalizing output voltages of at least two batteries comprising:

a capacitive storage element;

first and second switching circuits coupled to said storage element;

a control circuit wherein said control circuit is coupled to said switching circuits and wherein said switching circuits, in response to said control circuit, couple said storage element to first one battery and then the other thereby equalizing output voltages thereof.

2. An apparatus as in claim 1 wherein said storage element includes a plurality of capacitors.

3. An apparatus as in claim 1 wherein change stored on said element is transferable between the batteries as said element is coupled thereto.

4. An apparatus as in claim 1 wherein the batteries are series coupled.

5. A modular circuit for equalizing voltage on first and second batteries comprising:

a passive electrical energy storage element;

at least first and second solid state switches, wherein said switches each have a pole terminal and at least one output terminal and wherein said output terminals are coupled to respective batteries; and wherein said pole terminals of each of said switches are coupled to said storage element whereby electrical energy from one battery can be transferred to said storage element and then transferred to the other battery thereby equalizing voltages thereof.

6. A circuit as in claim 5 which includes a control element coupled to said pole terminals.

7. A circuit as in claim 5 which includes an inductor coupled to said storage element.

8. A circuit as in claim 5 which includes a pulse generating control unit.

9. A circuit as in claim 5 wherein said storage element includes a capacitor.

10. A circuit as in claim 5 wherein each of said switches has a second output terminal and each provides a single pole, double throw function.

11. An electrical vehicle comprising:

a moveable vehicle;

a plurality of series connected, rechargeable storage cells;

a plurality of battery equalization capacitors carried on said vehicle, wherein each of said capacitors is associated with at least one of said storage cells; and a plurality of solid state switches, coupled between said cells and said capacitors wherein first and second selected ones of said switches couple an associated capacitor to first one, then another of said cells to equalize output voltages thereof.

12. A vehicle as in claim 11 which includes circuitry for recharging said cells.

13. A vehicle as in claim 11 which includes circuitry for energizing an electric drive motor.

14. A vehicle as in claim 13 which includes an electric drive motor coupled to said energizing circuitry for moving said vehicle.

15. A vehicle as in claim 14 which includes control circuitry coupled to said switches.

16. A vehicle as in claim 11 which carries an auxiliary unit.

17. A vehicular propulsion system comprising:

a platform supported by a plurality of wheels;

an electric motor for driving at least one of said wheels to move said platform;

a plurality of series coupled, rechargeable batteries;

drive circuitry for coupling said plurality of batteries to said motor; and battery equalizer which includes:

a plurality of battery balancing capacitors and a plurality of solid state switches wherein each said switch and an associated capacitor are coupled to a common node; and wherein said capacitors are switchable between first and second batteries from said plurality at a predetermined rate thereby to minimize voltage differences therebetween.

18. A system as in claim 17 which includes a control element coupled at least to said drive circuitry.

19. A system as in claim 18 wherein said control element includes a programmable processor.

20. A system as in claim 17 wherein said capacitors and said switches are configured in a plurality of substantially identical modules.

21. A system as in claim 20 wherein said control element is coupled to said modules.

22. A system as in claim 21 wherein each of said modules is removably coupled to said battery equalizer.

23. A system as in claim 17 which includes a plurality of inductors wherein each of said inductors is coupled to one of said capacitors.

24. A system as in claim 17 which includes a housing for said batteries and wherein said battery equalizer is carried by said housing.

25. A method of equalizing output voltages of first and second batteries comprising:

(a) providing an electrical energy storage device;

(b) coupling one of the batteries, having a higher output voltage than the other to the storage device and transferring electrical energy from the coupled battery to the storage device during a first time interval;

(c) coupling the other of the batteries to the storage device and transferring at least part of the electrical energy stored thereat to the other battery during a second, different time interval; and (d) repeating steps (b)–(c) above.

26. A method as in claim 25 wherein the storage device is a capacitor and wherein in step (b) charge is transferred from the one battery to the capacitor thereby increasing a voltage thereon.

27. A method as in claim 26 wherein in step (c) charge is transferred from the capacitor, thereby reducing the voltage thereon, to the other battery.

28. An apparatus for equalizing output voltages of a plurality of batteries comprising:

a capacitive storage element;

switching circuits coupled to the batteries and to said element; and a control circuit coupled to said switching circuits and wherein said switching circuits in response to said control circuit couple said elements to said batteries sequentially thereby equalizing output voltages of the batteries.

29. An apparatus as in claim 28 wherein the batteries are series coupled.

30. A system to supply DC-type electrical energy to a load primarily from a source of AC and secondarily from a plurality of batteries, the system comprising:

at least first and second batteries;

a battery equalizer having at least one battery voltage equalizing capacitor;

at least first and second solid state switches wherein said switches couple said capacitor, first across one then the other of the batteries, at a predetermined rate, to thereby equalize output voltages thereof;

a transfer switch having a primary input, a secondary import and output port wherein said secondary input is coupled to at least one of said batteries and said output port is coupled to the load;

an AC to DC converter system with an AC input and a DC output wherein said AC input is couplable to a source of AC and said DC output is coupled to said primary input of said switch.

31. A system as in claim 30 wherein said equalizer includes a control unit having a clock source, wherein said clock source is coupled to said switches.

32. A system as in claim 30 wherein said batteries are coupled in series.

33. A system as in claim 30 which includes an inductor coupled to said capacitor.

34. A system as in claim 30 wherein the load is a portion of a telecommunications system and said transfer switch automatically switches from a first state of supplying energy to the load from said converter to a second state of supplying energy from at least one of said batteries in response to a loss of AC-type energy.

35. A system as in claim 30 wherein said equalizer includes a plurality of series connected batteries and a plurality of equalizing capacitors coupled to a plurality of switches.

36. A system as in claim 35 wherein said equalizer includes a common clock source coupled to said switches whereby said switches couple each of said capacitors to one battery and then to another.

37. A system as in claim 35 wherein said equalizer includes a plurality of clock sources wherein members of said plurality are coupled to selected switches.

38. A system as in claim 30 wherein the load is a portion of a data processing system and said transfer switch and said transfer switch automatically switches from a first state of supplying energy to the load from said converter to a second state of supplying energy from at least one of said batteries in response to a loss of AC-type energy.

* * * * *

Disclaimer 5,710,504 — Cesar Pascual; Philip T. Krein, both of Champaign, ILL. SWITCHED CAPACITOR SYSTEM FOR AUTOMATIC BATTERY EQUALIZATION. Patent dated January 20, 1998. Disclaimer filed August 11, 2003, by the assignee, The Board of Trustees of the University of Illinois.

Hereby enters this disclaimer to claims 1-10 and 25-38, of said patent.

*(Official Gazette, November 4, 2003)*